United States Patent
Kanno

(10) Patent No.: US 9,627,929 B2
(45) Date of Patent: Apr. 18, 2017

(54) WIRELESS POWER TRANSFER SYSTEM FOR WIRELESSLY TRANSFERRING ELECTRIC POWER IN NONCONTACT MANNER BY UTILIZING RESONANT MAGNETIC FIELD COUPLING

(71) Applicant: Panasonic Corporation, Osaka (JP)

(72) Inventor: Hiroshi Kanno, Osaka (JP)

(73) Assignee: Panasonic Intellectual Property Management Co., Ltd., Osaka (JP)

(*) Notice: Subject to any disclaimer, the term of this patent is extended or adjusted under 35 U.S.C. 154(b) by 806 days.

(21) Appl. No.: 14/068,384

(22) Filed: Oct. 31, 2013

(65) Prior Publication Data

US 2014/0125142 A1    May 8, 2014

Related U.S. Application Data

(60) Provisional application No. 61/721,691, filed on Nov. 2, 2012.

(51) Int. Cl.
  *H02J 17/00* (2006.01)
  *H02J 50/12* (2016.01)
  *H02J 7/02* (2016.01)

(52) U.S. Cl.
  CPC .............. *H02J 17/00* (2013.01); *H02J 50/12* (2016.02); *H02J 7/025* (2013.01)

(58) Field of Classification Search
  None
  See application file for complete search history.

(56) References Cited

U.S. PATENT DOCUMENTS 6,449,172 B2   9/2002   Nagahara
2001/0017779 A1   8/2001   Nagahara
(Continued)

FOREIGN PATENT DOCUMENTS

JP   4281362   6/2009
JP   4314709   8/2009
(Continued)

OTHER PUBLICATIONS

International Search Report issued Jan. 28, 2014 in International (PCT) Application No. PCT/JP2013/006481.
(Continued)

*Primary Examiner* — Jared Fureman
*Assistant Examiner* — Joel Barnett
(74) *Attorney, Agent, or Firm* — Wenderoth, Lind & Ponack, L.L.P.

(57) ABSTRACT

There is provided a frequency controller apparatus for use in a wireless power transmitter apparatus configured to wirelessly transmit an inputted power from a power transmitting antenna that includes a first resonant circuit, toward a power receiving antenna that includes a second resonant circuit and is electromagnetically coupled to the power transmitting antenna at a predetermined transmission frequency. The frequency controller apparatus includes a controller for changing the transmission frequency during a power transfer, and the controller sets a decrease amount when decreasing the transmission frequency, so that the decrease amount is smaller than an increase amount when the transmission frequency is increased.

6 Claims, 15 Drawing Sheets

(56) References Cited

U.S. PATENT DOCUMENTS

| | | | |
|---|---|---|---|
| 2007/0296393 A1* | 12/2007 | Malpas | A61B 5/0002 |
| | | | 323/355 |
| 2008/0278264 A1 | 11/2008 | Karalis et al. | |
| 2010/0187913 A1* | 7/2010 | Smith | H04B 5/0081 |
| | | | 307/104 |
| 2011/0037322 A1 | 2/2011 | Kanno | |
| 2011/0316348 A1 | 12/2011 | Kai et al. | |
| 2012/0153739 A1 | 6/2012 | Cooper et al. | |
| 2012/0262108 A1* | 10/2012 | Olson | H02J 7/025 |
| | | | 320/108 |
| 2013/0026848 A1 | 1/2013 | Ito | |

FOREIGN PATENT DOCUMENTS

| | | |
|---|---|---|
| JP | 2010-233442 | 10/2010 |
| JP | 2011-41464 | 2/2011 |
| JP | 2011-177009 | 9/2011 |

OTHER PUBLICATIONS

International Preliminary Report on Patentability and Written Opinion of the International Searching Authority issued May 14, 2015 in International (PCT) Application No. PCT/JP2013/006481.
Extended European Search Report issued Oct. 19, 2015 in corresponding European Application No. 13850352.9.

* cited by examiner

WIRELESS POWER TRANSFER SYSTEM FOR WIRELESSLY TRANSFERRING ELECTRIC POWER IN NONCONTACT MANNER BY UTILIZING RESONANT MAGNETIC FIELD COUPLING

CROSS-REFERENCE TO RELATION APPLICATION

This is an application which claims priority of U.S. provisional patent application No. 61/721,691 filed on Nov. 2, 2012, the contents of which is incorporated herein by reference.

BACKGROUND OF THE DISCLOSURE

1. Technical Field

The technical field relates to a wireless power transfer system configured to wirelessly transfer electric power in a noncontact manner by utilizing resonant magnetic field coupling, a wireless power transmitter apparatus for use in the wireless power transfer system, and a frequency controller apparatus and a power transfer method to be used for the wireless power transmitter apparatus.

2. Description of the Related Art

A Patent Document 1 discloses a wireless power transfer apparatus to transmit energy via a space between two resonant circuits. In this wireless power transfer apparatus, vibrational energy is wirelessly transmitted (in a noncontact manner) by coupling of two resonant circuits via leaching out (evanescent tail) of vibrational energy at a resonant frequency occurring in a peripheral space of the resonant circuits.

Patent documents related to the present disclosures are as follows:

Patent Document 1: Specification of USP application publication No. 2008/0278264 (FIGS. 12 and 14)

Patent Document 2: Japanese patent publication No. 4314709

Patent Document 3: Japanese patent publication No. 4281362

In order to improve long-term reliability of an electronic apparatus such as a wireless power transfer apparatus, it is necessary to reduce electrical stress to the elements that configure the electronic apparatus. The switching power apparatus described in the Patent Document 2 changes the oscillation frequency of a switching signal to drive the switching elements from a high frequency to a low frequency at the time of starting up the switching power apparatus, reducing damages to the switching elements. Moreover, the discharge lamp lighting device described in the Patent Document 3 reduces in steps the frequency of square waves applied from the DC-AC converter circuit to the resonant circuit in the startup interval.

Generally speaking, in a wireless power transfer system, the transmission frequency is adaptively controlled during the power transfer in order to maintain satisfactory transmission efficiency even when the power and current supplied to the load, the inputted voltage and current or a coupling coefficient between the power transmitting antenna and the power receiving antenna fluctuates or when the characteristics of the power transmitting antenna and the power receiving antenna differ from the designed values attributed to manufacturing variations and the like. However, the Patent Documents 2 and 3 describe no method of reducing the electrical stress to the components or elements of the system during the operation of the wireless power transfer system. Moreover, it is difficult to control changing of the transmission frequency during the power transfer so as not to give, for example, transitional electrical stress to the components or elements in the wireless power transfer circuit described in the Patent Document 1.

One non-limiting and exemplary embodiment provides a wireless power transfer system capable of relieving electrical stress to the components or elements as compared with the prior art, a wireless power transmitter apparatus for use in the wireless power transfer system, and a frequency controller apparatus and a power transfer method for use in the wireless power transmitter apparatus.

SUMMARY

In one general aspect, the techniques disclosed here feature: a frequency controller apparatus for use in a wireless power transmitter apparatus configured to wirelessly transmit an inputted power from a power transmitting antenna including a first resonant circuit, toward a power receiving antenna that includes a second resonant circuit and is electromagnetically coupled to the power transmitting antenna at a predetermined transmission frequency. The frequency controller apparatus includes a controller configured to change the transmission frequency during a power transfer. The controller sets a decrease amount when decreasing the transmission frequency, so that the decrease amount is smaller than an increase amount when the transmission frequency is increased.

These general and specific aspects may be implemented using a system, a method, and a computer program, and any combination of systems, methods, and computer programs.

According to the above configuration, there can be provided the wireless power transfer system capable of relieving electrical stress to the components or elements as compared with the prior art, the wireless power transmitter apparatus for use in the wireless power transfer system, and the frequency controller apparatus and the power transfer method for use in the wireless power transmitter apparatus. Additional benefits and advantages of the disclosed embodiments will be apparent from the specification and Figures. The benefits and/or advantages may be individually provided by the various embodiments and features of the specification and drawings disclosure, and need not all be provided in order to obtain one or more of the same.

BRIEF DESCRIPTION OF THE DRAWINGS

These and other objects and features of the present disclosure will become clear from the following description taken in conjunction with the embodiments thereof with reference to the accompanying drawings throughout which like parts are designated by like reference numerals, and in which.

DETAILED DESCRIPTION

Figure 1:
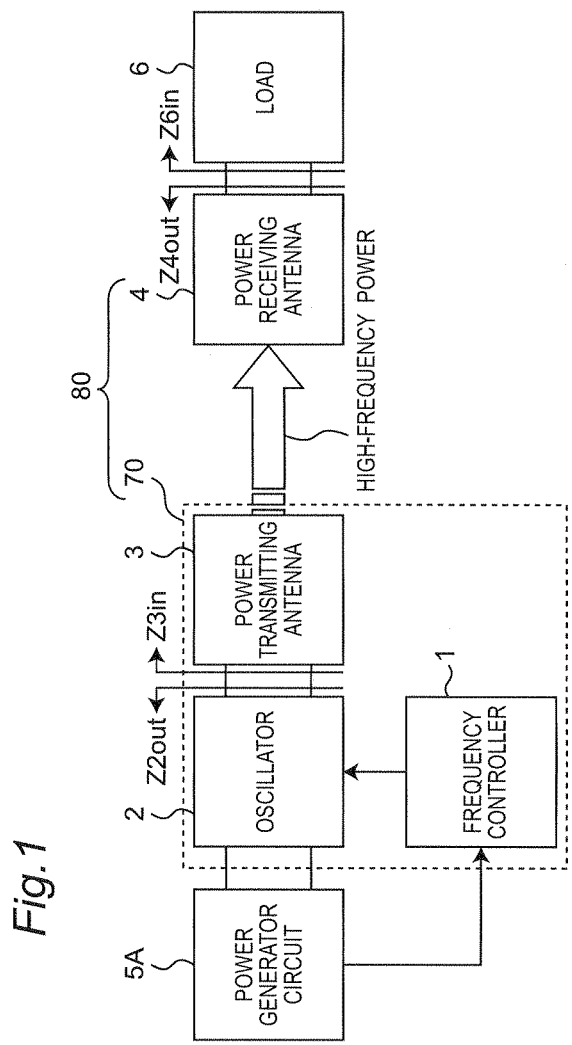
FIG. 1 is a block diagram showing a configuration of a wireless power transfer system 80 according to a first embodiment of the present disclosure.

Embodiments of the present disclosure will be described below with reference to the drawings. In the following embodiments, like components are denoted by like reference numerals.

First Embodiment

Figure 2:
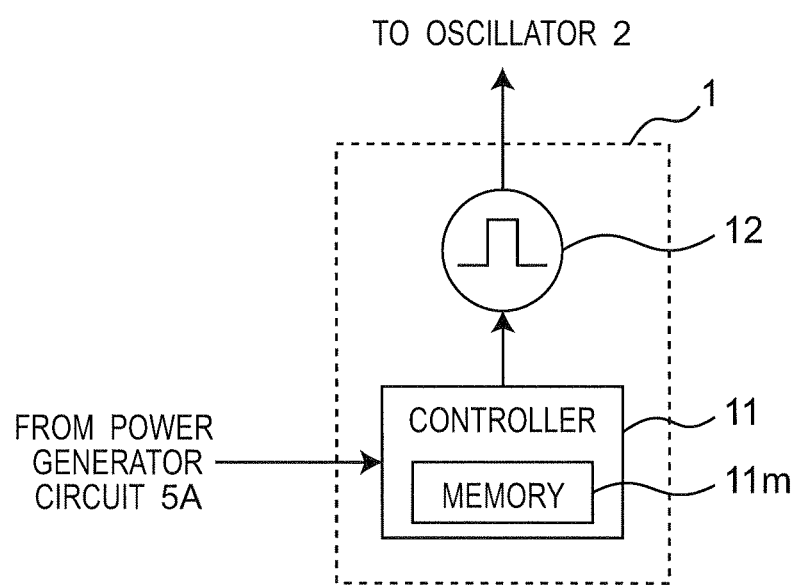
FIG. 2 is a block diagram showing a configuration of a frequency controller apparatus 1 of FIG. 1.
Figure 3:
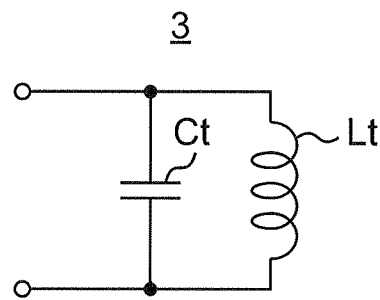
FIG. 3 is a circuit diagram showing a configuration of a power transmitting antenna 3 of FIG. 1.
Figure 4:
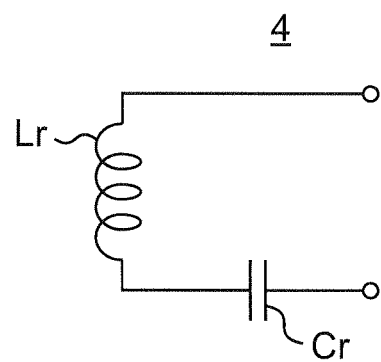
FIG. 4 is a circuit diagram showing a configuration of a power receiving antenna 4 of FIG. 1.
Figure 5:
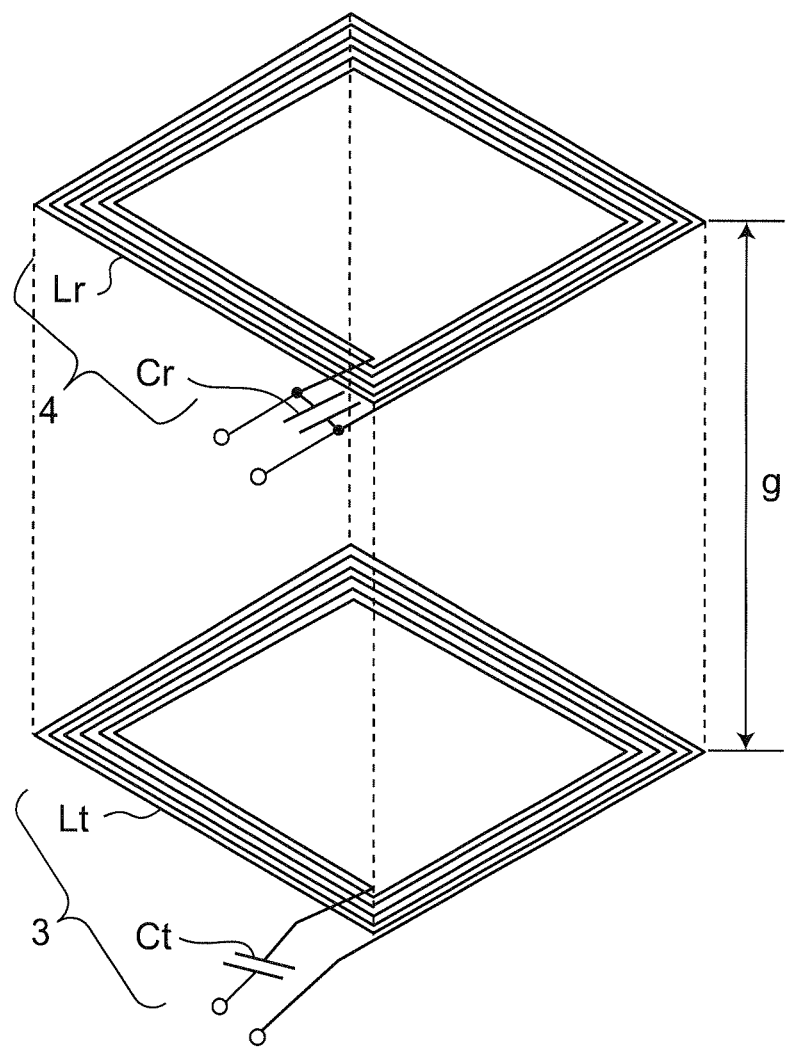
FIG. 5 is a perspective view showing a configuration of a power transmitting coil Lt and a power receiving coil Lr of FIG. 4.

FIG. 1 is a block diagram showing a configuration of a wireless power transfer system 80 according to a first embodiment of the present disclosure, and FIG. 2 is a block diagram showing a configuration of a frequency controller apparatus 1 of FIG. 1. FIG. 3 is a circuit diagram showing a configuration of a power transmitting antenna 3 of FIG. 1, and FIG. 4 is a circuit diagram showing a configuration of a power receiving antenna 4 of FIG. 1. Further, FIG. 5 is a perspective view showing a configuration of a power transmitting coil Lt and a power receiving coil Lr of FIG. 4.

Referring to FIG. 1, a power generator circuit 5A including, for example, solar cells outputs generated DC power to the wireless power transfer system 80. Moreover, the wireless power transfer system 80 converts the DC power from the power generator circuit 5A into high-frequency power, and wirelessly transmits the power to a load 6. The configuration and operation of the wireless power transfer system 80 are described below taking a case where the power generator circuit 5A includes the solar cell as an example. In this case, the power supplied from the power generator circuit 5A to the wireless power transfer system 80 changes in accordance with the amount of sunlight received by the solar cells. In concrete, it is known that, when the sunlight intensity (illuminance) irradiated to the solar cells changes, a current at each operating point at a maximum electric power (a current value and a voltage value for generating electricity at the maximum electric power) is substantially proportional to the illuminance, and the voltage becomes substantially constant. Therefore, the magnitude of power that should be transmitted from the power transmitting antenna 3 to the power receiving antenna 4 also changes.

Referring to FIG. 1, the wireless power transfer system 80 is configured to include a wireless power transmitter apparatus 70, and a power receiving antenna 4. Moreover, the wireless power transmitter apparatus 70 is configured to include a frequency controller apparatus 1, an oscillator 2, and a power transmitting antenna 3. In this case, as shown in FIG. 2, the frequency controller apparatus 1 is configured to include a controller 11 including a memory 11m, and a pulse generator 12. Moreover, referring to FIG. 1, the power transmitting antenna 3 includes an LC resonant circuit, and the oscillator 2 is configured to include, for example, a class D amplifier.

As shown in FIG. 3, the power transmitting antenna 3 has a resonant capacitor Ct and a power transmitting coil Lt, which are connected in parallel to each other, and is configured to include an LC parallel resonant circuit having a resonant frequency fT. On the other hand, as shown in FIG. 4, the power receiving antenna 4 has a resonant capacitor Cr and a power receiving coil Lr, which are connected in series to each other, and is configured to include an LC series resonant circuit having a resonant frequency fR. As shown in FIG. 5, the transmitting coil Lt and the receiving coil Lr are each square spiral coils, and are formed in a planar shape to be opposed to each other with a predetermined gap "g" provided between them. In this case, the gap "g" is set to, for example, several millimeters to tens of centimeters so that the power transmitting coil Lt and the power receiving coil Lr are electromagnetically coupled to each other at the time of resonance.

Referring to FIG. 2, the controller 11 controls the pulse generator 12 to generate a series of pulses having a predetermined transmission frequency ftr. In response to this, the pulse generator 12 generates a series of pulses having the transmission frequency ftr, and outputs the same pulses to the control terminal of the switching element of the oscillator 2. Moreover, referring to FIG. 1, the oscillator 2 converts the DC voltage from the power generator circuit 5A into a high-frequency voltage by switching of the switching element in the aforementioned class D amplifier according to the series of pulses from the pulse generator 12, and outputs a resulting voltage to the power transmitting antenna 3. When the power transmitting coil Lt and the power receiving coil Lr are provided to be adjacent with each other so as to be electromagnetically coupled to each other at the time of resonance, the high-frequency voltage from the oscillator 2 is electrically transmitted to the power receiving antenna 4 via the power transmitting antenna 3 at the transmission frequency ftr, and is supplied to the load 6. That is, the electric power from the power generator circuit 5A is transmitted in a noncontact manner by resonant magnetic field coupling between the power transmitting antenna 3 and the power receiving antenna 4.

It is noted that the power transmitting antenna 3 and the power receiving antenna 4 are not any ordinary antennas for transmitting and receiving of radiated electromagnetic field but the components or elements for performing energy transfer between two objects by utilizing coupling of proximate components or elements (evanescent tail) of the electromagnetic field of a resonant circuit as described above. According to the wireless power transfer utilizing the resonant magnetic field, no energy loss (radiation loss) occurs when radio waves are propagated to a distant place, and therefore, the electric power can be transferred with extremely high efficiency. In the energy transfer utilizing such a coupling of resonance electromagnetic fields (near fields), not only the loss is less than that of the well-known wireless power transfer utilizing the Faraday's law of electromagnetic induction but also it is possible to transfer energy with high efficiency between two resonant circuits (antennas) located, for example, several meters apart. It is noted that the resonant frequency fT and/or fR needs not completely coincide with the transmission frequency ftr.

Moreover, in FIG. 1, an output impedance Z2out when the input terminal of the power transmitting antenna 3 is viewed from the output terminal of the oscillator 2 is set to be substantially equal to an input impedance Z3in when the output terminal of the oscillator 2 is viewed from the input terminal of the power transmitting antenna 3 when the load 6 is connected to the power receiving antenna 4. Further, an output impedance Z4out when the load 6 is viewed from the output terminal of the power receiving antenna 4 is set to be substantially equal to an input impedance Zin when the output terminal of the power receiving antenna 4 is viewed from the load 6 when the oscillator 2 is connected to the power transmitting antenna 3. The fact that the impedances are substantially equal to each other means or device that the magnitude of a difference between the absolute values of the impedances is 25% or less than the absolute value of the larger impedance. With this setting, the multipath reflection of the high-frequency energy between the circuit blocks is suppressed, allowing the total transmission efficiency to be substantially improved.

The inventor and others of the present application obtained a new knowledge that the currents flowing and voltages applied to the components or elements of the wireless power transfer system 80 transitionally changed when the transmission frequency ftr was reduced from a high value to a low value, while such transitional changes (hereinafter, referred to as an electrical stress) in the voltage and current do not substantially occur when the transmission frequency ftr was increased from a low value to a high value. Moreover, there was obtained knowledge that the electrical stress generated in the components or elements could be further relieved as the decrease amount in the transmission frequency ftr is narrow when the transmission frequency ftr is decreased. It is noted that the components or elements of the wireless power transfer system 80 concretely include smoothing capacitors included in the circuits of the power generator circuit 5A and so on, transistors included in the circuits of the oscillator 2 and so on, the resonant capacitor Ct of the power transmitting antenna 3, the resonant capacitor Cr of the power receiving antenna 4, and capacitors and inductors used for impedance matching. The controller 11 of FIG. 2 sets the transmission frequency ftr on the basis of these knowledges as follows.

Figure 6:
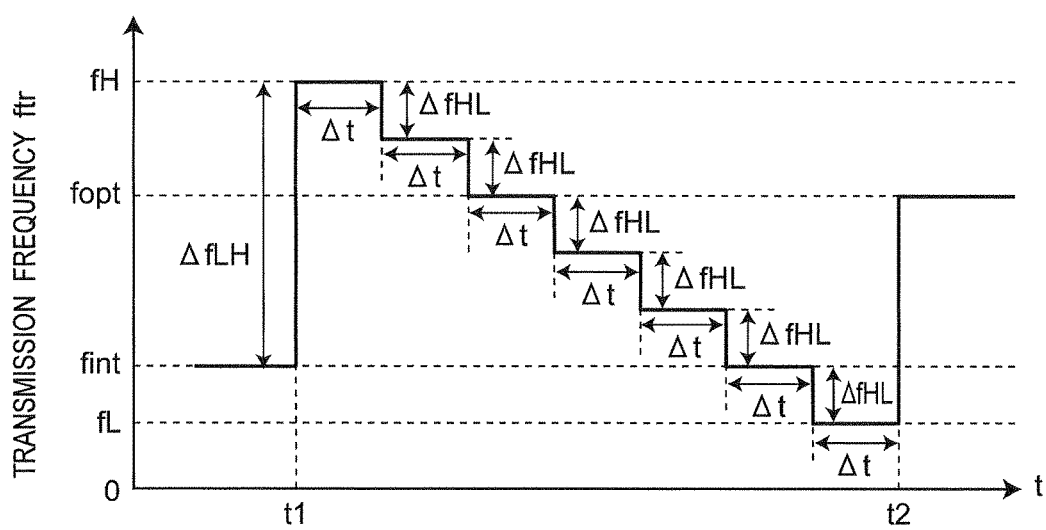
FIG. 6 is a graph showing a method of setting a transmission frequency ftr by a controller 11 of FIG. 2.

FIG. 6 is a graph showing a method of setting the transmission frequency ftr by the controller 11 of FIG. 2. Referring to FIG. 6, the controller 11 controls the transmission frequency ftr to first set the transmission frequency ftr to a predetermined initial frequency fint between a predetermined minimum frequency fL and a predetermined maximum frequency fH, and start the power transfer. Next, the controller 11 increases the transmission frequency ftr by an increase amount ΔfLH from the initial frequency fint to the maximum frequency fH at a timing t1. When a predetermined convergence time Δt has elapsed from the timing t1, the controller 11 measures the voltage and current outputted from the power generator circuit 5A, and stores the measurement results into the memory 11m. Next, the controller 11 decreases the transmission frequency ftr by a predetermined decrease amount ΔfHL. When the predetermined convergence time Δt has elapsed, the controller 11 measures the voltage and current outputted from the power generator circuit 5A, and stores the measurement results into the memory 11m. By subsequently decreasing the transmission frequency ftr to the minimum frequency fL by the decrease amount ΔfHL, the voltages and currents outputted from the power generator circuit 5A are measured and stored into the memory 11m.

At a timing t2, the controller 11 stores the voltage and current outputted from the power generator circuit 5A when the transmission frequency ftr is the minimum frequency fL into the memory 11m, and thereafter retrieves the optimum transmission frequency fopt that is the transmission frequency ftr when the maximum power of the voltages and the currents stored in the memory 11m is achieved. Then, the power transfer is performed by setting the transmission frequency ftr to the optimum transmission frequency fopt. Referring to FIG. 6, the decrease amount ΔfHL is set to be smaller than the increase amount ΔfLH.

As described above, the controller 11 once increases the transmission frequency ftr by the increase amount ΔfLH from the initial frequency fint to the maximum frequency fH during the power transfer, and thereafter decreases the frequency to the minimum frequency fL by the decrease amount ΔfHL smaller than the decrease amount ΔfLH. Immediately after decreasing the transmission frequency ftr, the electrical stress generated in the elements increases further than that in the steady state. However, since the decrease amount ΔfHL is set to be smaller than the increase amount ΔfLH, adverse effects given to the reliability of the elements can be reduced. Since the electrical stress generated in the components or elements immediately after the transmission frequency ftr is increased does not become larger than that in the steady state, no additional stress is applied to the components or elements even when the increase amount ΔfLH is set to be larger.

Although it is proper to set the decrease amount ΔfHL as small as possible in order to retrieve the optimum transmission frequency fopt with high accuracy, this leads to an increase in the retrieval time. When the retrieval time increases, such a risk that safety hazards occur in the load 6 and such a risk that the power supply to the load 6 stagnates rise. According to the present embodiment, the transmission frequency ftr can be controlled at a higher speed and more safely than those in the prior art by setting the decrease amount ΔfHL according to the wireless power transfer system 80.

Unless the current value flowing through the components or elements and the voltage value applied between the terminals of the components or elements are suppressed, a large influence occurs in the selection of the components. In general, there is such a tendency that the elements of larger maximum current rated values are increased in size, and the capacitors with large withstand voltages are increased in size. According to the present embodiment, the electrical stress to the components or elements of the wireless power transfer system 80 during the power transfer can be relieved, and therefore, the elements of small maximum current rated values can be used as compared with the prior art, and the wireless power transfer system 80 can be reduced in size.

Moreover, there is generally such a tendency that the loss increases in a capacitor with a larger withstand voltage, and the cost increases. According to the present embodiment, since the electrical stress to the components or elements of the wireless power transfer system 80 can be relieved during the power transfer, the loss and the cost increase can be avoided by using capacitors with small withstand voltages as compared with the prior art, and a wireless power transfer system 80 of a low cost and a high transmission efficiency can be achieved as compared with the prior art. Further, as compared with a case where a plurality of capacitors that have comparatively small withstand voltages are connected in series to function as a capacitor of a high withstand voltage, size reduction and high efficiency operation of the wireless power transfer system 80 can be achieved. Furthermore, according to the present embodiment, the long-term reliability of the wireless power transfer system 80 can be improved as compared with the prior art.

It is noted that the method of setting the transmission frequency ftr is not limited to the setting method shown in FIG. 6. For example, the transmission frequency ftr may be increased a plurality of times for frequency change from the initial frequency fint to the maximum frequency fH. Also, in this case, each increase amount is set to be larger than the decrease amount ΔfHL. Moreover, decrease amounts of the transmission frequency ftr reduced from the maximum frequency fH to the minimum frequency fL need not be mutually equal but set so that the maximum value of the decrease amount ΔfHL is smaller than the minimum value of the increase amount ΔfLH.

Although the power transmitting coil Lt and the power receiving coil Lr are spiral coils having a square shape of one layer (See FIG. 5) in the present embodiment, the present disclosure is not limited to this. The shapes of the power transmitting coil Lt and the power receiving coil Lr may each be another shape of a circle, a rectangle, an oval or the like. Moreover, winding methods of the power transmitting coil Lt and the power receiving coil Lr may be other methods of helical or solenoidal winding or the like. Further, the number of turns of each of the power transmitting coil Lt and the power receiving coil Lr is required to be at least one turn. A coil having a loop structure results when the number of turns is one. Moreover, when the number of turns is two or more, each coil is not required to be made of a conductor pattern of one layer but allowed to have such a configuration that a plurality of layered conductor patterns are connected in series to each other.

Further, the power transmitting coil Lt and the power receiving coil Lr in the present embodiment are formed of conductors of, for example, copper or silver having a satisfactory electrical conductivity. Since the high-frequency current flows in concentration through the surface of the conductor, the surface of the conductor may be coated with a material of high conductivity or a magnetic material of high magnetic permeability in order to improve the transmission efficiency. Moreover, when the power transmitting coil Lt and the power receiving coil Lr are formed by using a conductor having a cavity at the center in the cross section of the conductor, the power transmitting antenna 3 and the power receiving antenna 4 can be reduced in weight. Further, since the conductor loss per unit length can be reduced when the power transmitting coil Lt and the power receiving coil Lr are formed by using a conductor having a parallel wiring structure of Litz wire or the like, the Q value of the resonant circuit can be improved, and the power transfer with higher transmission efficiency becomes possible.

Furthermore, it is acceptable to collectively form wiring by using an ink printing technology in order to suppress the manufacturing cost. Moreover, it is acceptable to arrange a magnetic material around the power transmitting coil Lt and/or the power receiving coil Lr. Furthermore, by using an inductor having an air core spiral structure, a coupling coefficient between the power transmitting coil Lt and the power receiving coil Lr can be set to a desired value.

Moreover, all types of capacitors having, for example, a chip shape or a lead shape can be utilized for the resonant capacitors Ct and Cr. For example, it is acceptable to make a capacitance between two wirings via air function as the resonant capacitors Ct and Cr. Moreover, when the resonant capacitors Ct and Cr are configured to include a MIM capacitor, a capacitance circuit of comparatively low loss can be formed by using the well-known semiconductor processes or multilayer substrate processes.

Figure 7:
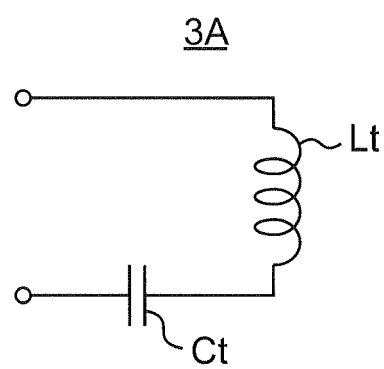
FIG. 7 is a circuit diagram showing a configuration of a power transmitting antenna 3A according to a modified embodiment of the first embodiment of the present disclosure.
Figure 8:
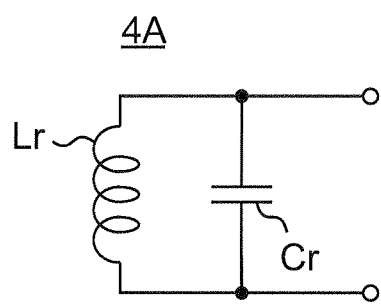
FIG. 8 is a circuit diagram showing a configuration of a power receiving antenna 4A according to a modified embodiment of the first embodiment of the present disclosure.

Further, although the power transmitting antenna 3 is a parallel resonant circuit (See FIG. 3) and the power receiving antenna 4 is a series resonant circuit (See FIG. 4) in the present embodiment, the present disclosure is not limited to this. A power transmitting antenna 3A according to a modified embodiment of the first embodiment of the present disclosure of FIG. 7 may be used in place of the power transmitting antenna 3. The power transmitting antenna 3A is a series resonant circuit having a resonant capacitor Ct and a power transmitting coil Lt. Moreover, a power receiving antenna 4A according to the modified embodiment of the first embodiment of the present disclosure of FIG. 8 may be used in place of the power receiving antenna 4. The power receiving antenna 4A is a parallel resonant circuit having a resonant capacitor Cr and a power receiving coil Lr. Moreover, the power transmitting antenna 3 and the power receiving antenna 4 may each be self-resonant circuits utilizing the parasitic capacitances of respective wirings.

Furthermore, in the present embodiment, the transmission frequency ftr is set to an ISM band of, for example, 50 Hz to 300 GHz, 20 kHz to 10 GHz, 20 kHz to 20 MHz, 20 kHz to 1 MHz or to 6.78 MHz or 13.56 MHz.

Moreover, although the oscillator 2 is configured to include the class D amplifier in the present embodiment, the present disclosure is not limited to this. The oscillator 2 may be configured to include an amplifier that can achieve high-efficiency low-distortion characteristics such as a class E amplifier or a class F amplifier or using a Doherty amplifier. Moreover, it is acceptable to generate sine waves with high efficiency by arranging a lowpass filter or a bandpass filter in the succeeding stage of the switching element that generates an output signal including distortional components or elements. In this case, the lowpass filter or the bandpass filter may function as a matching circuit. Furthermore, the oscillator 2 may be a frequency converter circuit configured to convert the DC voltage from the power supply circuit 5A into a high-frequency voltage. Whatever the case may be, the oscillator 2 is only required to convert the inputted DC power into the high-frequency energy and output the energy to the power transmitting antenna 3.

It is noted that the transmission efficiency of the wireless power transfer system 80 depends on the gap "g" (antenna gap) between the power transmitting antenna 3 and the power receiving antenna 4 and the magnitude of the loss of the circuit elements that configure the power transmitting antenna 3 and the power receiving antenna 4. The "antenna gap" is substantially the gap "g" between the power transmitting antenna 3 and the power receiving antenna 4. The antenna gap can be evaluated on the basis of the size of the area where the power transmitting antenna 3 and the power receiving antenna 4 are arranged. In this case, the size of the area where the power transmitting antenna 3 and the power receiving antenna 4 are arranged corresponds to the size of the area where the antenna whose size is relatively small. The size is the diameter of the coil in the case where the external shape of the coil that configures the antenna is circular, the length of one side of the coil in the case where it is square or the length of the short side of the coil in the case where it is rectangular.

Moreover, the Q value of each of the resonant circuits of the power transmitting antenna 3 and the power receiving antenna 4 depends on the required transmission efficiency and the value of the coupling coefficient between the power transmitting coil Lt and the power receiving coil Lr. In this case, the Q value is set to, for example, 100 or more, 200 or more, 500 or more or 1000 or more. In order to achieve a high Q value, it is effective to adopt the Litz wire as described above.

FIRST MODIFIED EMBODIMENT OF FIRST EMBODIMENT

Figure 9:
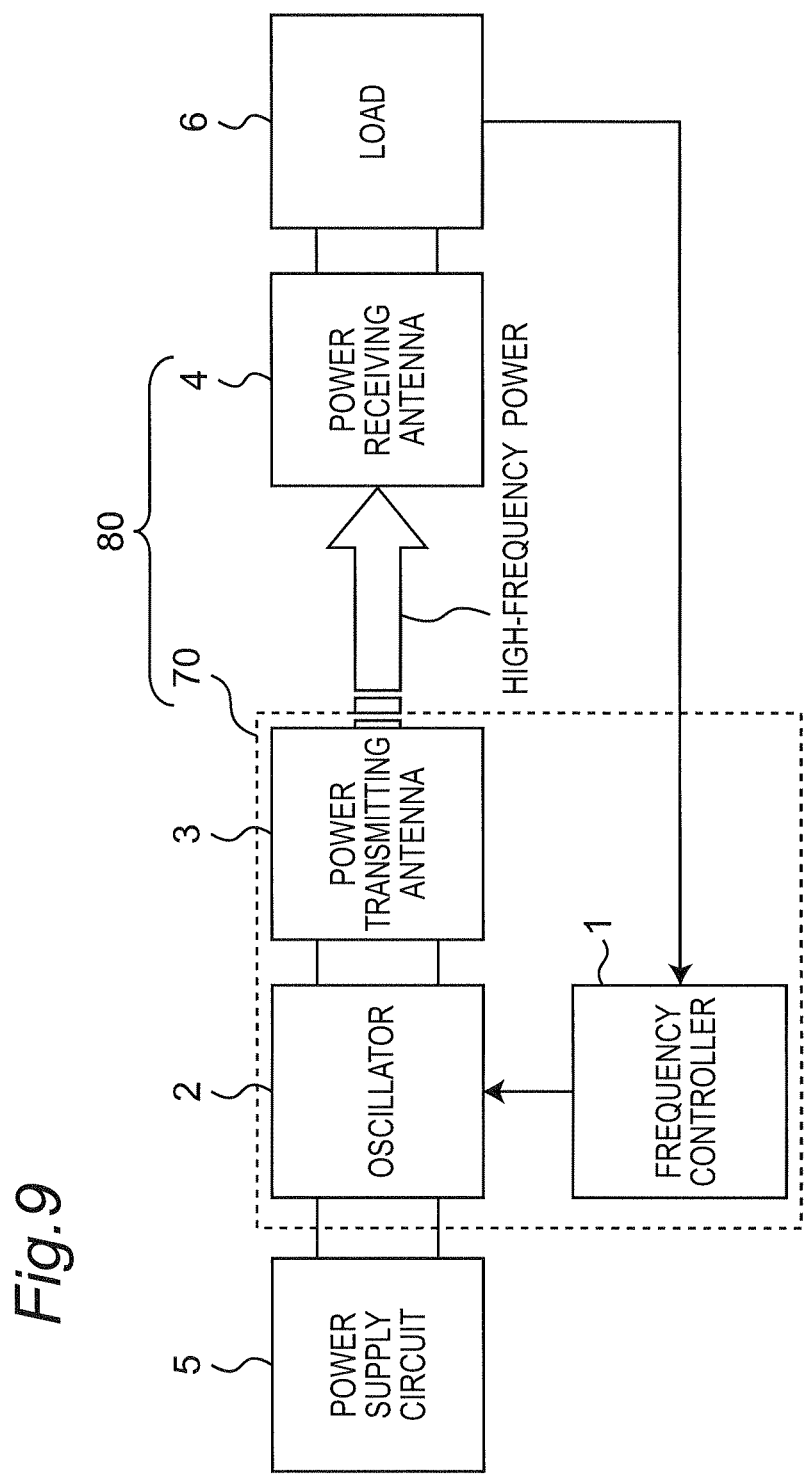
FIG. 9 is a block diagram showing a configuration of a wireless power transfer system 80 according to a first modified embodiment of the first embodiment of the present disclosure.

FIG. 9 is a block diagram showing a configuration of a wireless power transfer system 80 according to the first modified embodiment of the first embodiment of the present disclosure. Referring to FIG. 9, the power supply circuit 5 converts AC power from a commercial AC power source into DC power, and outputs a resulting power to the wireless power transfer system 80. Moreover, the wireless power transfer system 80 converts the DC power from the power supply circuit 5 into high-frequency power, and transmits a resulting power to the load 6. The magnitude of the power that should be transmitted from the power transmitting antenna 3 to the power receiving antenna 4 changes in accordance with a change in the power necessary for the load 6. In the present modified embodiment, the controller 11 of the frequency controller apparatus 1 of FIG. 9 retrieves the optimum transmission frequency fopt when the voltage and current outputted to the load 6 become the desired voltage and current within a frequency range of the minimum frequency fL to the maximum frequency fH on the basis of the voltage and current outputted from the power receiving antenna 4 to the load 6 during the power transfer.

In the present modified embodiment and the following embodiments, the controller 11 may retrieve the optimum transmission frequency fopt when the voltage and current outputted to the load 6 become the desired voltage and current within the frequency range of the minimum frequency fL to the maximum frequency fH on the basis of the voltage and current inputted to the power transmitting antenna 3 during the power transfer. Moreover, the controller 11 may retrieve the optimum transmission frequency fopt when the transmission efficiency becomes maximized within the frequency range of the minimum frequency fL to the maximum frequency fH during the power transfer. The controller 11 is required to measure the transmission power characteristic that is at least one of the voltage and current inputted to the wireless power transmitter apparatus 70, the voltage and current outputted from the power receiving antenna 4, and the transmission efficiency, and adopt the transmission frequency when the power transfer characteristic satisfies a predetermined condition as the optimum transmission frequency fopt.

Figure 10:
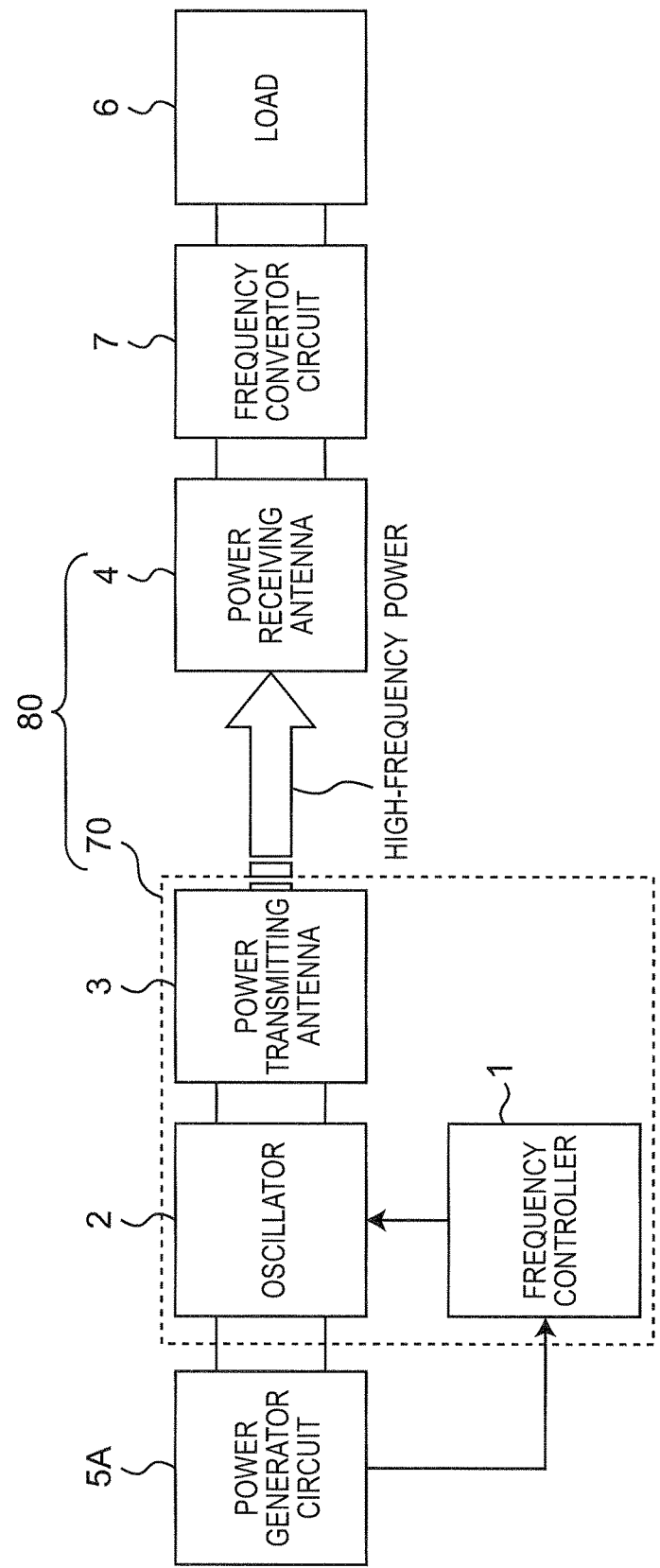
FIG. 10 is a block diagram showing a configuration when a frequency converter circuit 7 is added between the wireless power transfer system 80 of the first embodiment of the present disclosure and a load 6.

Moreover, although the power receiving antenna 4 is directly connected to the load 6 in the first embodiment and its modified embodiment, the present disclosure is not limited to this. FIG. 10 is a block diagram showing a configuration when a frequency converter circuit 7 is added between the wireless power transfer system 80 of the first embodiment of the present disclosure and the load 6. Referring to FIG. 10, the frequency converter circuit 7 converts the high-frequency energy (electric power) supplied from the power receiving antenna 4 into a power of a frequency necessary for the load 6. In this case, the power after the conversion may be DC power or AC power.

SECOND EMBODIMENT

Figure 11:
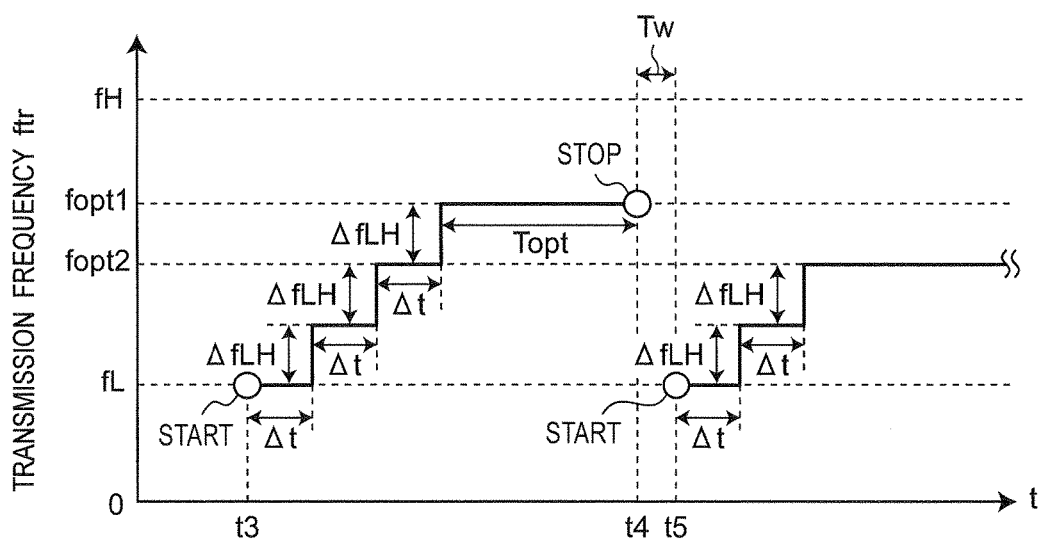
FIG. 11 is a graph showing a method of setting a transmission frequency ftr according to a second embodiment of the present disclosure.

FIG. 11 is a graph showing a method of setting the transmission frequency ftr according to the second embodiment of the present disclosure. Referring to FIG. 11, the controller 11 controls the transmission frequency ftr to first set the transmission frequency ftr to the minimum frequency fL at a timing t3, and start the power transfer. When a predetermined convergence time Δt has elapsed from the timing t1, the controller 11 measures the voltage and current outputted to the load 6. Then, the controller 11 judges whether or not the measured voltage and current are the desired voltage and current. When the measured voltage and current are not any desired voltage and current, the controller 11 increases the transmission frequency ftr by the predetermined increase amount ΔfLH, and the controller 11 measures the voltage and current outputted to the load 6 when the predetermined convergence time Δt has elapsed. Subsequently, the controller 11 measures the voltage and current outputted to the load 6 while increasing the transmission frequency ftr by the predetermined increase amount ΔfLH, and adopts the present transmission frequency ftr as an optimum transmission frequency fopt1 when the measured voltage and current are the desired voltage and current. Then, the controller controls the stationary operation to be performed for a predetermined operating time Topt at the optimum transmission frequency fopt1 without stopping the power transfer.

Referring to FIG. 11, after performing the power transfer for the predetermined operating time Topt at the optimum transmission frequency fopt1, the controller 11 controls the power transfer to stop the power transfer at a timing t4. Then, at a timing t5 after a predetermined wait time Tw has elapsed, the controller controls the transmission frequency ftr to set the transmission frequency ftr to the initial frequency Pint, and start the power transfer. Subsequently, the controller retrieves an optimum transmission frequency fopt2 in a manner similar to that of the optimum transmission frequency fopt1, and perform the power transfer for a predetermined operating time Topt at the retrieved optimum transmission frequency fopt2 without stopping the power transfer. It is noted that the transmission frequency fopt2 is not always identical to the optimum transmission frequency fopt1 since the states of the load 6, the power generator circuit 5 or a positional relation between the power transmitting antenna 3 and the power receiving antennas 4 possibly temporarily changes.

As described above, according to the present embodiment, the controller 11 increases the transmission frequency ftr without decreasing the frequency upon sweeping the transmission frequency ftr during the power transfer. Moreover, the controller 11 measures the voltage and current outputted to the load 6 every time when the transmission frequency ftr is increased in steps from the predetermined minimum frequency fL, and controls the transmission frequency ftr to inhibit increasing the transmission frequency ftr and continue the power transfer when the measured voltage and current satisfy predetermined conditions. That is, when the voltage and current supplied to the load 6 become the desired voltage and current before the transmission frequency ftr reaches the maximum frequency fH within the frequency sweep range, the frequency sweep is interrupted, and a shift to the stationary operation is performed at the transmission frequency ftr at the time of interruption.

Therefore, according to the present embodiment, the change in the transmission frequency ftr during the power transfer is limited only to an increase, and therefore, the electrical stress to the components or elements can be relieved as compared with the prior art.

THIRD EMBODIMENT

Figure 12:
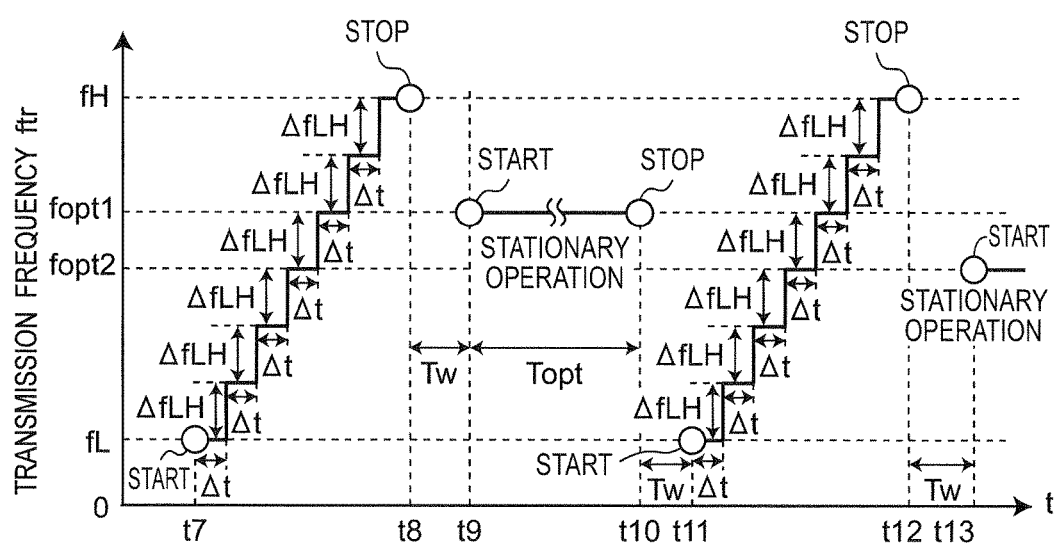
FIG. 12 is a graph showing a method of setting the transmission frequency ftr according to a third embodiment of the present disclosure.

FIG. 12 is a graph showing a method of setting the transmission frequency ftr according to the third embodiment of the present disclosure. Referring to FIG. 12, the controller 11 controls the transmission frequency ftr to first set the transmission frequency ftr to the minimum frequency fL at a timing t7, and start the power transfer. When a predetermined convergence time Δt has elapsed from the timing t7, the controller 11 measures the voltage and current outputted from the power generator circuit 5A, and stores the measurement results into the memory 11m. Next, the controller 11 reduces the transmission frequency ftr by a predetermined increase amount ΔfLH. When the predetermined convergence time Δt has elapsed, the controller 11 measures the voltage and current outputted from the power generator circuit 5A, and stores the measurement results into the memory 11m. Subsequently, the controller measures the voltage and the current outputted from the power generator circuit 5A and stores them into the memory 11m while increasing the transmission frequency ftr by the increase amount ΔfLH to the maximum frequency fH.

The controller 11 controls the memory 11m to store the voltage and current outputted from the power generator circuit 5A into the memory 11m at a timing t8, thereafter stop the power transfer when the transmission frequency ftr is the maximum frequency fH, and then retrieve the optimum transmission frequency fopt1 that is the transmission frequency ftr when the maximum electric power is achieved among the voltages and currents stored in the memory 11m. Then, at a timing t9 when the wait time Tw has elapsed, the controller controls the transmission frequency ftr to set the transmission frequency ftr to the optimum transmission frequency fopt1, and start the power transfer, performing the power transfer for the operating time Topt.

Further, the controller 11 controls the power transfer to stop the power transfer at a timing t10 when the operating time Topt has elapsed from the timing t9, set the transmission frequency ftr to the minimum frequency fL at a timing t11 when the wait time Tw has elapsed, and start the power transfer. Subsequently, the controller 11 retrieves the optimum transmission frequency fopt2 in a manner similar to that of the optimum transmission frequency fotp1, stops the power transfer, and thereafter performs again the stationary operation at the optimum transmission frequency fopt2.

As described above, the controller 11 measures the voltage and current outputted from the power generator circuit 5A every time when the transmission frequency ftr is increased in steps from the predetermined minimum frequency fL to the predetermined maximum frequency fH upon sweeping the transmission frequency ftr, and stores them into the memory 11m. Then, the controller controls the power transfer to stop the power transfer after sweeping the transmission frequency ftr, retrieve the transmission frequency corresponding to the voltage and current that satisfy the predetermined conditions among the voltages and currents stored in the memory 11m, and start the power transfer at the retrieved transmission frequency.

Therefore, according to the present embodiment, the change in the transmission frequency ftr during the power transfer is limited only to an increase, and therefore, the electrical stress to the components or elements can be relieved as compared with the prior art.

MODIFIED EMBODIMENT OF THIRD EMBODIMENT

Figure 13:
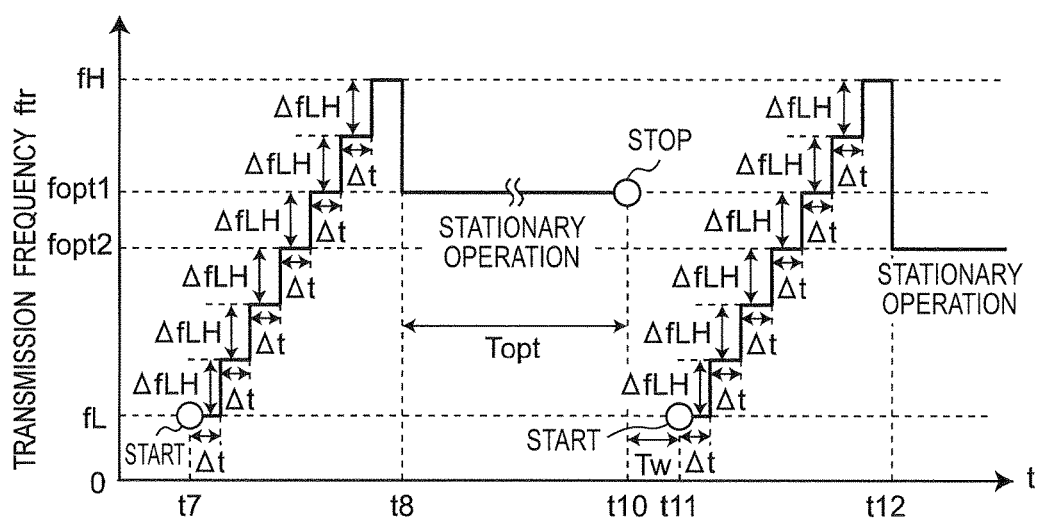
FIG. 13 is a graph showing a method of setting the transmission frequency ftr according to a modified embodiment of the third embodiment of the present disclosure.

FIG. 13 is a graph showing a method of setting the transmission frequency ftr according to a modified embodiment of the third embodiment of the present disclosure. The setting method of FIG. 13 differs from the setting method of FIG. 12 in the setting method at the timings t8 and t12. At the timing t8 of FIG. 13, the controller 11 sets the transmission frequency ftr to the optimum transmission frequency fopt1 while controlling the DC voltage to lower the DC voltage from the power supply circuit 5 or the power generator circuit 5A or the driving voltage of the oscillator 2 without stopping the power transfer, and makes a shift to the stationary operation. Moreover, at the timing t12, the controller 11 sets the transmission frequency ftr to the optimum transmission frequency fopt2 while controlling the DC voltage to lower the DC voltage from the power supply circuit 5 or the power generator circuit 5A or the driving voltage of the oscillator 2 without stopping the power transfer, and makes a shift to the stationary operation. By this operation, the input voltage to the power transmitting antenna 3 decreases at the timings t8 and t12.

As described above, the controller 11 measures the voltage and current outputted from the power generator circuit 5A every time when the transmission frequency ftr is increased in steps from the predetermined the minimum frequency fL to the predetermined maximum frequency fH upon sweeping the transmission frequency ftr, and stores them into the memory 11m. Then, the controller controls the input voltage to decrease the input voltage to the oscillator 2 without stopping the power transfer (i.e., to decrease the input voltage to the wireless power transmitter apparatus 70) after sweeping the transmission frequency ftr, retrieve the transmission frequency corresponding to the voltage and current that satisfy the predetermined conditions among the voltages and currents stored in the memory 11m, and start the power transfer at the retrieved transmission frequency.

According to the present embodiment, there is the possibility of decreasing the transmission frequency ftr by a decrease amount that is slightly larger than the increase amount ΔfLH at the timings t8 and t12. However, the control is performed to decrease the input voltage to the power transmitting antenna 3 by lowering the DC voltage from the power supply circuit 5 or the power generator circuit 5A or the driving voltage of the oscillator 2, and therefore, the electrical stress to the components or elements can be relieved without stopping the power transfer.

IMPLEMENTAL EXAMPLES

The wireless power transfer system 80 of an implemental example of the first embodiment was produced, and the electrical stress to the components or elements of the wireless power transfer system was evaluated. In concrete, the coupling coefficient between the power transmitting coil Lt and the power receiving coil Lr was set to 0.25, the gap "g" between the opposed faces was set to 5 cm, and the power transmitting coil Lt and the power receiving coil Lr were magnetically coupled to each other. Moreover, the power transmitting coil Lt and the power receiving coil Lr were made of Litz wires each of which were configured by arranging in parallel mutually insulated 100 copper wires each having a diameter of 80 μm. Further, the power transmitting coil Lt and the power receiving coil Lr were each formed into a circular shape of an external diameter of 10 cm, and the Q value of the resonant circuit of the power transmitting antenna 3 at the unloaded time was set to 320.

Figure 14:
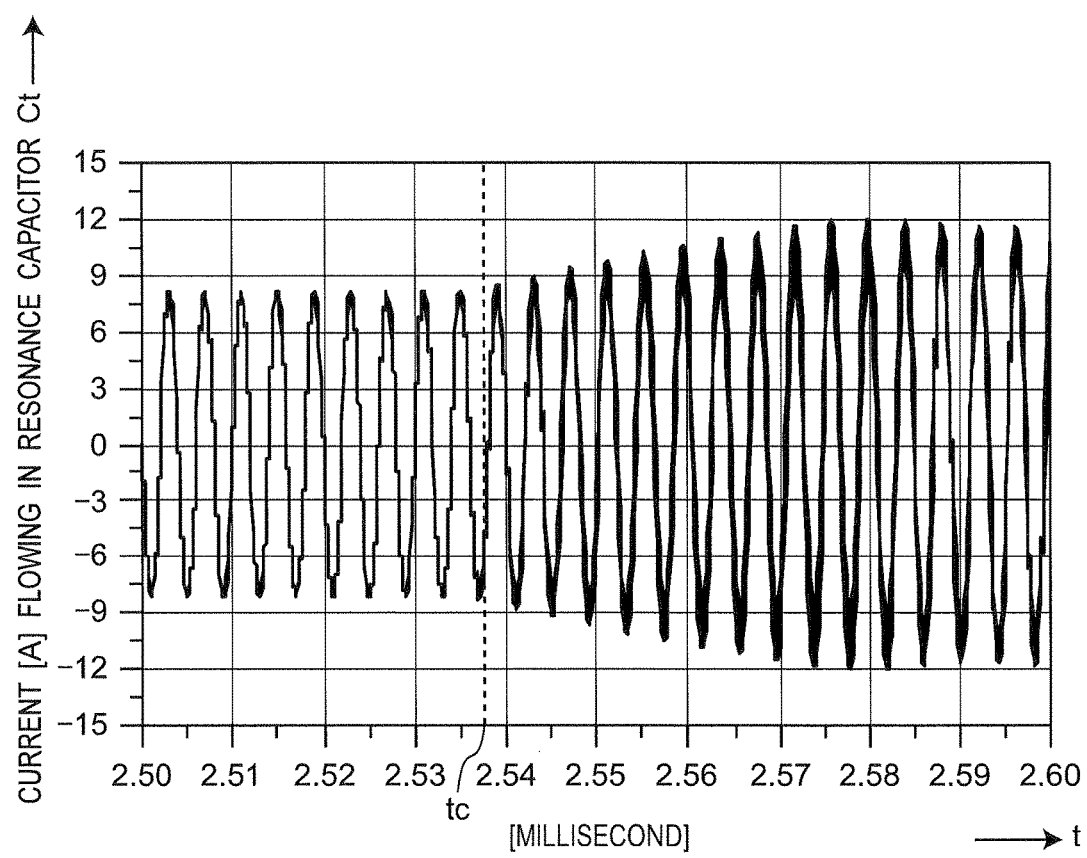
FIG. 14 is a graph showing temporal changes in a current flowing in a resonant capacitor Ct when the transmission frequency ftr is changed from 250 kHz to 245 kHz at a timing tc in a wireless power transfer system 80 according to an implemental example of the first embodiment of the present disclosure.
Figure 15:
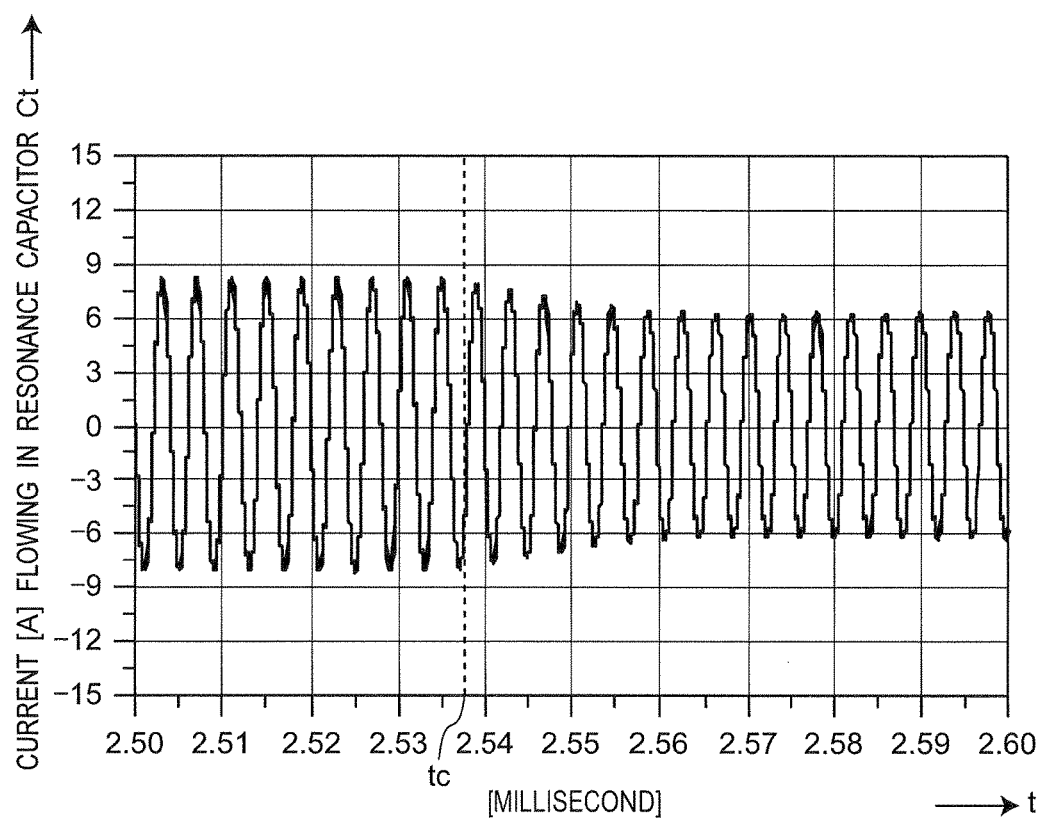
FIG. 15 is a graph showing temporal changes in the current flowing in the resonant capacitor Ct when the transmission frequency ftr is changed from 250 kHz to 255 kHz at a timing tc in the wireless power transfer system 80 of the implemental example of the first embodiment of the present disclosure.

FIG. 14 is a graph showing temporal changes in the current flowing in the resonant capacitor Ct when the transmission frequency ftr is changed from 250 kHz to 245 kHz at a timing tc in the wireless power transfer system 80 of the implemental example of the first embodiment of the present disclosure. FIG. 15 is a graph showing temporal changes in the current flowing in the resonant capacitor Ct when the transmission frequency ftr is changed from 250 kHz to 255 kHz at a timing tc in the wireless power transfer system 80 of the implemental example of the first embodiment of the present disclosure. As shown in FIG. 14, the amount of current transitionally increases when the transmission frequency ftr is decreased. On the other hand, as shown in FIG. 15, no transitional increase in the current occurs when the transmission frequency ftr is increased. It is noted that the phenomenon of the current increase in FIG. 15 is not any increase in the steady current value occurring during the power transfer at the transmission frequency ftr of 245 kHz but consistently a transitional increase in the current value.

Figure 16:
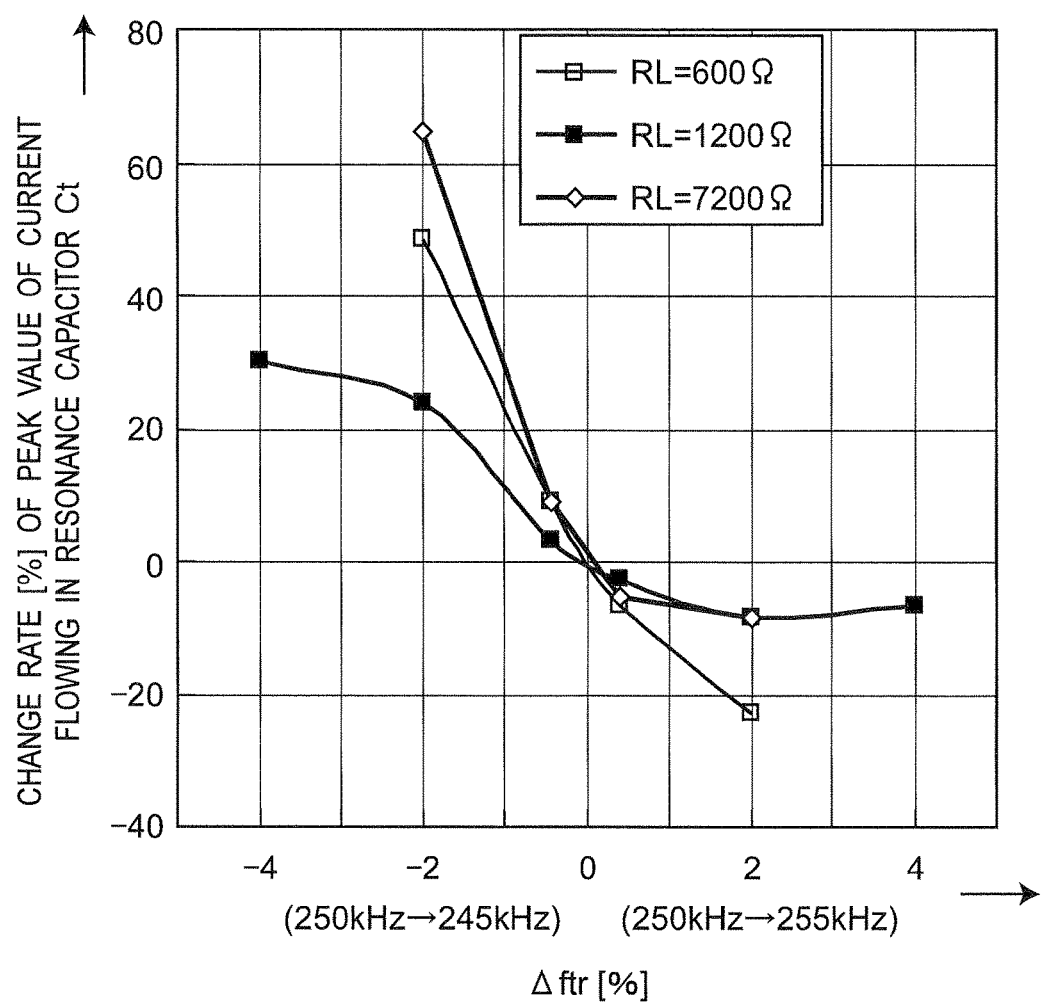
FIG. 16 is a graph showing a relation between a change rate Δftr of the transmission frequency ftr and a change rate of the peak value of the current flowing in the resonant capacitor Ct when a load resistance value RL of the load 6 is changed in the wireless power transfer system 80 of the implemental example of the first embodiment of the present disclosure.

FIG. 16 is a graph showing a relation between a change rate Δftr of the transmission frequency ftr and a change rate of the peak value of the current flowing in the resonant capacitor Ct when the load resistance value RL of the load 6 is changed in the wireless power transfer system 80 of the implemental example of the first embodiment of the present disclosure. The change rate of the peak value of the current flowing in the resonant capacitor Ct within 0.5 seconds after a change in the transmission frequency ftr is shown. As apparent from FIG. 16, the change rate does not depend on the resistance value RL of the load 6, and the electrical stress to the resonant capacitor Ct is relieved when the transmission frequency ftr is increased as compared with when it is decreased. Moreover, it was discovered that the electrical stress to the resonant capacitor Ct was further relieved as the decrease amount is less when the transmission frequency ftr was decreased.

Figure 17:
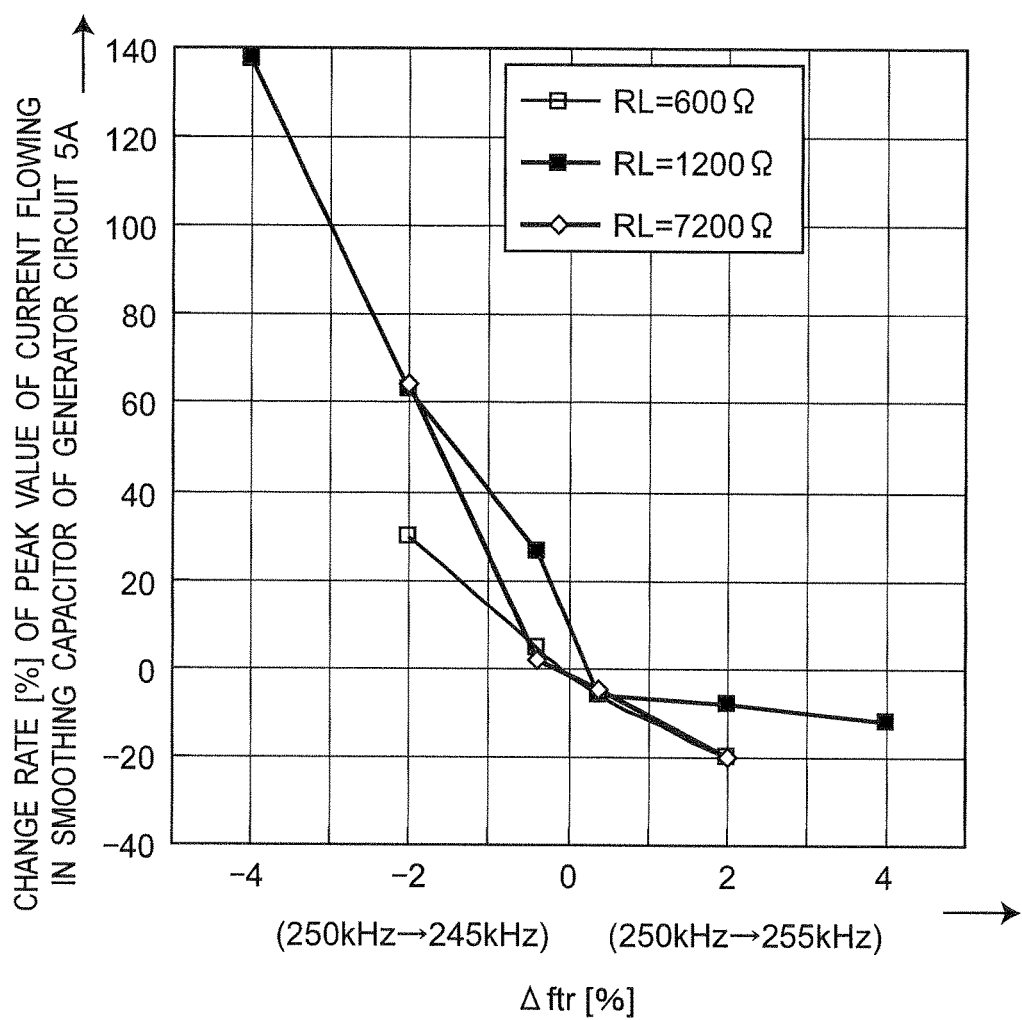
FIG. 17 is a graph showing a relation between the change rate Δftr of the transmission frequency ftr and a change rate of a peak value of a current flowing in a smoothing capacitor of the power generator circuit 5A when the load resistance value RL of the load 6 is changed in the wireless power transfer system 80 of the implemental example of the first embodiment of the present disclosure.

FIG. 17 is a graph showing a relation between the change rate Δftr of the transmission frequency ftr and a change rate of the peak value of the current flowing in the smoothing capacitor of the power generator circuit 5A when the load resistance value RL of the load 6 is changed in the wireless power transfer system 80 of the implemental example of the first embodiment of the present disclosure. In a manner similar to that of FIG. 16, the change rate does not depend on the resistance value RL of the load 6, and the electrical stress to the smoothing capacitor is relieved when the transmission frequency ftr is increased as compared with when it is decreased. Moreover, it was discovered that the electrical stress to the smoothing capacitor was further relieved as the decrease amount is less when the transmission frequency ftr was decreased.

Further, it could be confirmed that the voltage applied to the resonant capacitor Ct, the voltage applied to the resonant capacitor Cr and the current flowing in the resonant capacitor Cr also had tendencies similar to those of FIGS. 16 and 17.

In the wireless power transfer system 80 of the implemental example of the first embodiment, the optimum transmission frequency fopt was retrieved with the settings: fint=250 kHz, fH=280 kHz, fL=220 kHz, ΔfHL=1 kHz, ΔfLH=30 kHz, and Δt=5 milliseconds in FIG. 6. As a result, the retrieval time could be shortened by 145 milliseconds corresponding to an interval for changing the setting of the transmission frequency ftr 29 times as compared with the wireless power transfer system of a comparative example with the setting: ΔfLH=1 kHz.

Moreover, an implemental example of the settings that the resistance value of the load 6 set to 600Ω and ΔfHL=1 kHz was compared with comparative examples of the settings that ΔfHL=2, 5 and 10 kHz. As a result, the integrated quantity of the effective value of the current flowing in the resonant capacitor Ct generated at the time of change of the transmission frequency ftr within the frequency range of 60 kHz from the maximum frequency fH to the minimum frequency fL became 2.0-fold, 5.1-fold and 7.2-fold, respectively. Moreover, the integrated quantity of the effective value of the current flowing in the smoothing capacitor became 1.9-fold, 4.8-fold and 7.6-fold, respectively.

As described above, it was discovered that the excessive electrical stress generated in the wireless power transfer system of the prior art was relieved by the wireless power transfer system 80 of the first embodiment of the present disclosure. Therefore, low-loss elements of lower withstand voltages as compared with those of the prior art can be selected, and therefore, the heat generation can be reduced, allowing the cost to be reduced. Moreover, there is no need to use elements of lower withstand voltages by connecting them in series, and the apparatus can be reduced in size as compared with the prior art.

As mentioned above, according to the first aspect, there is provided a frequency controller apparatus for use in a wireless power transmitter apparatus configured to wirelessly transmit an inputted power from a power transmitting antenna including a first resonant circuit, toward a power receiving antenna that includes a second resonant circuit and is electromagnetically coupled to the power transmitting antenna at a predetermined transmission frequency. The frequency controller apparatus includes a controller configured to change the transmission frequency during a power transfer. The controller sets a decrease amount when decreasing the transmission frequency, so that the decrease amount is smaller than an increase amount when the transmission frequency is increased.

Therefore, the electrical stress to the components or elements can be relieved as compared with the prior art.

According to the second aspect, there is provided a frequency controller apparatus for use in a wireless power transmitter apparatus configured to wirelessly transmit an inputted power from a power transmitting antenna including a first resonant circuit, toward a power receiving antenna that includes a second resonant circuit and is electromagnetically coupled to the power transmitting antenna at a predetermined transmission frequency. The frequency controller apparatus includes a controller configured to change the transmission frequency during a power transfer. The controller increases the transmission frequency upon sweeping the transmission frequency without decreasing the transmission frequency.

Therefore, the electrical stress to the components or elements can be relieved as compared with the prior art.

In the frequency controller apparatus according to the second aspect, the frequency controller apparatus according to the third aspect is configured such that the controller measures a predetermined power transfer characteristic every time when the transmission frequency is increased in steps from a predetermined minimum frequency upon sweeping the transmission frequency, and controls the power transfer to inhibit increasing the transmission frequency and continue the power transfer when the measured power transfer characteristic satisfies a predetermined condition.

Therefore, since the change in the transmission frequency during the power transfer is limited only to an increase, the electrical stress to the components or elements can be relieved as compared with the prior art.

In the frequency controller apparatus according to the second aspect, the frequency controller apparatus according to the fourth aspect is configured such that the controller measures a predetermined power transfer characteristic every time when the transmission frequency is increased in steps from a predetermined minimum frequency to a predetermined maximum frequency upon sweeping the transmission frequency, and stores the characteristic into a storage unit. The controller controls the power transfer to stop the power transfer after sweeping the transmission frequency, retrieves a transmission frequency corresponding to the power transfer characteristic that satisfies a predetermined condition among the power transfer characteristics stored in the storage unit, and starts the power transfer at the retrieved transmission frequency.

Therefore, since the change in the transmission frequency during the power transfer is limited only to an increase, the electrical stress to the components or elements can be relieved as compared with the prior art.

In the frequency controller apparatus according to the second aspect, the frequency controller apparatus according to the fifth aspect is configured such that the controller measures a predetermined power transfer characteristic every time when the transmission frequency is increased in steps from a predetermined minimum frequency to a predetermined maximum frequency upon sweeping the transmission frequency, and stores the characteristic into a storage unit. The controller controls an input voltage to the wireless power transmitter apparatus to be decreased without stopping the power transfer after sweeping the transmission frequency, retrieves a transmission frequency corresponding to the power transfer characteristic that satisfies a predetermined condition among the power transfer characteristics stored in the storage unit, and changes the transmission frequency to the retrieved transmission frequency.

According to the present aspect, the electrical stress to the components or elements can be relieved without stopping the power transfer.

In the frequency controller apparatus according to the third to fifth aspects, the frequency controller apparatus according to the sixth aspect is configured such that the power transfer characteristic is at least one of a voltage and a current inputted to the wireless power transmitter apparatus, a voltage and a current outputted from the power receiving antenna, and a transmission efficiency.

Therefore, the transmission frequency can be determined on the basis of at least one of the voltage and current inputted to the wireless power transmitter apparatus, the voltage and current outputted from the power receiving antenna, and the transmission efficiency.

The wireless power transmitting apparatus according to the seventh aspect is configured to includes the frequency controller apparatus according to any one of the first to sixth aspects; a power transmitting antenna; and a power transmitter circuit configured to convert an inputted power into a power having the transmission frequency, and to output a resulting power to the power transmitting antenna.

Therefore, the electrical stress to the components or elements can be relieved as compared with the prior art.

In the wireless power transmitting apparatus according to the seventh aspect, the wireless power transmitting apparatus according to the eighth aspect is configured such that an output impedance when an input terminal of the power transmitting antenna is viewed from an output terminal of the power transmitter circuit is set to be substantially equal to an input impedance when the output terminal of the power transmitter circuit is viewed from the input terminal of the power transmitting antenna.

Therefore, the transmission efficiency in the wireless transmitter apparatus can be substantially maximized.

A wireless power transfer system according to the ninth aspect includes the wireless power transmitter apparatus according to the seventh or eighth aspect; and a power receiving antenna.

Therefore, the electrical stress to the components or elements can be relieved as compared with the prior art.

In the wireless power transfer system according to the tenth aspect, the wireless power transfer system according to the ninth aspect is configured such that the power receiving antenna is connected to a load. An output impedance when the load is viewed from an output terminal of the power receiving antenna is set to be substantially equal to an input impedance when the output terminal of the power receiving antenna is viewed from the load.

Therefore, the transmission efficiency in the wireless power transfer system can be substantially maximized.

According to the eleventh aspect, there is provided a power transfer method for use in a wireless power transmitter apparatus configured to wirelessly transmit an inputted power from a power transmitting antenna including a first resonant circuit, toward a power receiving antenna that includes a second resonant circuit and is electromagnetically coupled to the power transmitting antenna at a predetermined transmission frequency. The power transfer method includes a control step of changing the transmission frequency during a power transfer. The control step includes a step of setting a decrease amount when decreasing the transmission frequency, so that the decrease amount is smaller than an increase amount when the transmission frequency is increased.

Therefore, the electrical stress to the components or elements can be relieved as compared with the prior art.

According to the twelfth aspect, there is provided a power transfer method for use in a wireless power transmitter apparatus configured to wirelessly transmit an inputted power from a power transmitting antenna including a first resonant circuit, toward a power receiving antenna that includes a second resonant circuit and is electromagnetically coupled to the power transmitting antenna at a predetermined transmission frequency. The power transfer method includes a control step of changing the transmission frequency during a power transfer. The control step includes a step of increasing the transmission frequency upon sweeping the transmission frequency without decreasing the transmission frequency.

Therefore, the electrical stress to the components or elements can be relieved as compared with the prior art.

The frequency controller apparatus, the wireless power transmitter apparatus, the wireless power transfer system and the power transfer method of the disclosure of the present disclosure can be applied to the charging systems of electronic equipment that uses a rechargeable battery, electric motorcycles, electrically assisted bicycles or electric vehicles. Moreover, the frequency controller apparatus, the wireless power transmitter apparatus, the wireless power transfer system and the power transfer method of the disclosure of the present disclosure can be applied to power supply systems for various equipment such as AV equipment, and home electric appliances. In this case, the AV equipment includes, for example, television sets and laptop type personal computers, and the home electric appliances include, for example, washing machines, refrigerators, and air conditioners. Further, the frequency controller apparatus, the wireless power transmitter apparatus, the wireless power transfer system and the power transfer method of the disclosure of the present disclosure can also be applied to systems that collect electric power generated by solar photovoltaic power generation apparatuses.

Although the present disclosure has been fully described in connection with the embodiments thereof with reference to the accompanying drawings, it is to be noted that various changes and modifications are apparent to those skilled in the art. Such changes and modifications are to be understood as included within the scope of the present disclosure as defined by the appended claims unless they depart therefrom.

What is claimed is:

1. A frequency controller apparatus for use in a wireless power transmitter apparatus configured to wirelessly transmit an inputted power from a power transmitting antenna including a first resonant circuit, toward a power receiving antenna that includes a second resonant circuit and is electromagnetically coupled to the power transmitting antenna at a predetermined transmission frequency, the frequency controller apparatus comprising:
a controller configured to change the transmission frequency during a power transfer,
wherein the controller sets a decrease amount when decreasing the transmission frequency, so that the decrease amount is smaller than an increase amount when the transmission frequency is increased.

2. A wireless power transmitter apparatus comprising:
a frequency controller apparatus;
a power transmitting antenna; and
a power transmitter circuit configured to convert an inputted power into a power having the transmission frequency, and to output a resulting power to the power transmitting antenna,
wherein the frequency controller apparatus is provided for use in a wireless power transmitter apparatus configured to wirelessly transmit an inputted power from the power transmitting antenna including a first resonant circuit, toward a power receiving antenna that includes a second resonant circuit and is electromagnetically coupled to the power transmitting antenna at a predetermined transmission frequency,
wherein the frequency controller apparatus comprises a controller configured to change the transmission frequency during a power transfer, and
wherein the controller sets a decrease amount when decreasing the transmission frequency, so that the decrease amount is smaller than an increase amount when the transmission frequency is increased.

3. The wireless power transmitter apparatus as claimed in claim 2,
wherein an output impedance when an input terminal of the power transmitting antenna is viewed from an output terminal of the power transmitter circuit is set to be substantially equal to an input impedance when the output terminal of the power transmitter circuit is viewed from the input terminal of the power transmitting antenna.

4. A wireless power transfer system comprising:
a wireless power transmitter apparatus; and
a power receiving antenna,
wherein the wireless power transmitter apparatus comprises:
a frequency controller apparatus;
a power transmitting antenna; and
a power transmitter circuit configured to convert an inputted power into a power having the transmission frequency, and to output a resulting power to the power transmitting antenna,
wherein the frequency controller apparatus is provided for use in a wireless power transmitter apparatus configured to wirelessly transmit an inputted power from the power transmitting antenna including a first resonant circuit, toward the power receiving antenna that includes a second resonant circuit and is electromagnetically coupled to the power transmitting antenna at a predetermined transmission frequency,
wherein the frequency controller apparatus comprises a controller configured to change the transmission frequency during a power transfer, and
wherein the controller sets a decrease amount when decreasing the transmission frequency, so that the decrease amount is smaller than an increase amount when the transmission frequency is increased.

5. The wireless power transfer system as claimed in claim 4,
wherein the power receiving antenna is connected to a load; and
wherein an output impedance when the load is viewed from an output terminal of the power receiving antenna is set to be substantially equal to an input impedance when the output terminal of the power receiving antenna is viewed from the load.

6. A power transfer method for use in a wireless power transmitter apparatus configured to wirelessly transmit an inputted power from a power transmitting antenna including a first resonant circuit, toward a power receiving antenna that includes a second resonant circuit and is electromagnetically coupled to the power transmitting antenna at a predetermined transmission frequency, the power transfer method comprising:

a control step of changing the transmission frequency during a power transfer,
wherein the control step includes a step of setting a decrease amount when decreasing the transmission frequency, so that the decrease amount is smaller than an increase amount when the transmission frequency is increased.

* * * * *